United States Patent Office 2,891,064
Patented June 16, 1959

2,891,064
3,3-DICHLORO-2-METHYLALLYLAMINES

Donald G. Kundiger, Manhattan, Kans., and Huey Pledger, Jr., Midland, Mich., assignors to The Dow Chemical Company, Midland, Mich., a corporation of Delaware No Drawing. Application May 28, 1956
Serial No. 587,469

4 Claims. (Cl. 260—293)

This invention is concerned with 3,3-dichloro-2-methylallylamines. It is particularly directed to amines having the formula

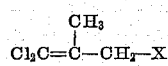

wherein X represents a member of the group consisting of N-chloro-pyridino, piperidino, morpholino, and mono- and di-(hydrocarbon substituted) amino, the latter substituting hydrocarbon structures being selected from the class consisting of lower alkyl, phenyl and cyclohexyl radicals. The expression "lower alkyl" as employed herein is inclusive of alkyl radicals containing from 1–8 carbon atoms, inclusive, and the expression "phenyl radicals" is inclusive of the unsubstituted phenyl radical and phenyl radicals containing 1 or 2 alkyl, chloro or bromo substituents.

The compounds of the invention are liquids or crystalline solids somewhat soluble in many organic solvents and generally of limited solubility in water. The N-chloropyridino compound is appreciably soluble in water and most of the novel amine compounds are soluble in aqueous mineral acid solutions. The novel compounds have been found useful as selective herbicides for the control of grass weeds and as insecticides for the control of insect pests such as spider mites, house flies and roaches.

The novel compounds may be prepared by reacting a suitable primary or secondary amine or pyridine with 1,1,3-trichloro-2-methyl-1-propene or with 3,3,3-trichloro-2-methyl-1-propene. Good results are obtained when employing at least one molar proportion of amine to each molar proportion of trichloromethylpropene reactant. The reaction is somewhat exothermic and proceeds readily when the amine and trichloromethylpropene reactants are contacted at a reaction temperature.

In one preferred method of preparation, the reactants are contacted in the proportions of at least 2 moles of amine reactant to one mole of trichloromethylpropene. In such mode of operation, any hydrogen chloride formed in the reaction reacts with excess amine starting material to form the corresponding amine hydrochloride as a by-product. Alternatively, the reactants may be employed in substantially equimolar proportions and any hydrogen chloride of reaction may be removed by a hydrogen chloride acceptor such as an alkali or alkaline earth metal carbonate.

The reaction temperature varies somewhat depending upon the nature of the amine starting material employed. Thus, for example, with many of the amine reactants, the reaction is initiated when the amine and trichloromethylpropene reactants are contacted at temperatures of from 20° to 30° C. and the heat of reaction serves to raise the temperature of the reaction mixture and aid in accomplishing completion of the reaction. With certain of the amines, it is preferred to heat the amine reactant with a portion of the trichloromethylpropene at a temperature of from 60° to 160° C. to initiate the reaction and thereafter to add the remainder of the trichloromethylpropene with further heating as required to complete the reaction. In most such cases, the heat of reaction maintains the reaction mixture at an elevated temperature and the rate of the reaction can be controlled by the rate of addition of the trichloromethylpropene compound.

Upon completion of the reaction, the desired 3,3-dichloro-2-methylallylamine product may be isolated by conventional procedures such as filtration, washing and distillation or recrystallization. In practice, it is generally convenient to add a solvent such as benzene, toluene or ether to the crude reaction mixture to dissolve the desired amine product and thereafter to separate the solution of product from insoluble by-product amine hydrochloride by filtration or by washing with water. The solution of the desired 3,3-dichloro-2-methylallylamine is then distilled to remove the solvent and obtain the desired product as a residue. The latter may then be further purified by distillation or recrystallization, if desired.

The following examples illustrate the invention but are not to be construed as limiting the same.

Example 1

46.5 grams (0.5 mole) of aniline and 79.9 grams (0.5 mole) of 1,1,3-trichloro-2-methyl-1-propene were dissolved in 500 milliliters of acetone and 82.9 grams (0.6 mole) of finely divided anhydrous potassium carbonate added thereto with stirring. The resulting mixture was heated at a temperature of 55°–60° C. and maintained at such temperature with stirring and under reflux for a period of 5 hours. The resulting crude reaction product was cooled and poured into 2 liters of water. This mixture separated into an aqueous layer and an organic layer. The latter was separated and the aqueous lyer extracted with ether. The organic layer and ether extract were combined, dried over anhydrous magnesium sulfate, filtered and fractionally distilled to recover the ether solvent and to obtain an N-(3,3-dichloro-2-methylallyl) aniline product as a colorless liquid boiling at 111° to 116° C. under 0.9 millimeter pressure and having a density of 1.243 at 20°/4° C. and a refractive index (n/D) of 1.584 at 20° C. The product was found to contain 55.26 percent by weight of carbon, 5.15 percent by weight of hydrogen and 32.45 percent by weight of chlorine by analysis, as compared to theoretical values of 55.58, 5.13 and 32.82 percent respectively, calculated for N-(3,3-dichloro-2-methylallyl) amine.

Example 2

186 grams (2 moles) of aniline and 159.5 grams (1 mole) of 3,3,3-trichloro-2-methyl-1-propene were mixed together and heated at gradually increasing temperatures up to about 120° C. An exothermic reaction ensued and without further external heating, the temperature of the reaction mixture rose rapidly to about 240° C. On completion of the reaction, as evidenced by a marked drop in temperature of the reaction mixture, the latter was cooled to about 20° C. and the resulting solid product agitated with a mixture of water and ether. The ether extract was separated, dried and distilled as in Example 1 to obtain the desired N-(3,3-dichloro-2-methylallyl) aniline product.

Example 3

96 grams (0.6 mole) of 3,3,3-trichloro-2-methyl-1-propene was added portionwise with stirring to 158 grams (1.22 mole) of di-normalbutylamine at room temperature. The addition was carried out during a period of about 5 minutes and in this period the temperature of the reaction mixture rose to 45° C. The mixture was then heated at increasing temperatures up to about 115° C. for 5 minutes. Vigorous reaction ensued and the temperature of the reaction mixture rose rapidly to 197° C. and remained at such temperature for a period of 7 minutes. On cooling, the reaction mixture solidified. Dry ether was added with stirring to the crude reaction product to dissolve the amine product and to produce a slurry of insoluble di-normalbutylamine-hydrochloride by-product in the ether solution. The slurry was filtered and the filtrate evaporated to remove the ether and to obtain as a residue an N,N-dinormalbutyl-N-(3,3-dichloro-2-methylallyl)amine product having a boiling point of 71°–73° C. under 0.25 millimeter pressure and characterized by a refractive index ($n/D$) of 1.470 at 20° C. and a density 20°/4° C.) of 0.996.

Example 4

258 grams (2 moles) of 1,1,3,3-tetramethylbutylamine and 159.5 grams (1 mole) of 3,3,3-trichloro-2-methyl-1-propene were mixed and heated to a temperature of 134° C. under reflux. Vigorous reaction ensued and the temperature of the mixture rose gradually to about 180° C. in a period of about 30 minutes without external heating. The crude product was cooled, slurried with ether and filtered as in Example 3. The filtrate was distilled to recover ether and to obtain an N-(1,1,3,3-tetramethylbutyl)-N-(3,3-dichloro-2-methylallyl)amine product as a liquid, boiling at 78°–80° C. under 0.5 to 0.6 millimeter pressure and having a refractive index ($n/D$) of 1.479 at 20° C. and a density (20°/4° C.) of 1.061.

Example 5

214.4 grams (2 moles) of N-methylaniline and 159.5 grams (1 mole) of 3,3,3-trichloro-2-methyl-1-propene were mixed and heated to a temperature of 134° C. under reflux. Vigorous reaction ensued and the temperature of the mixture rose rapidly to 219° C. On completion of the reaction, the crude product was cooled and mixed with dry ether to precipitate the methylaniline-hydrochloride by-product as a red, crystalline solid. Water was added to dissolve the hydrochloride and the ether layer, containing the desired amine product, separated. The ether layer was dried and distilled to recover the solvent and to obtain an N-(3,3-dichloro-2-methylallyl)-N-methylaniline product as a liquid, boiling at 95°–105° C. under 0.1 to 0.5 millimeter pressure and characterized by a refractive index ($n/D$) of 1.576 at 20° C. and a density (20°/4° C.) of 1.208.

Example 6

174 grams (2 moles) of morpholine and 159.5 grams (1 mole) of 3,3,3-trichloro-2-methyl-1-propene were mixed together rapidly at room temperature. Reaction ensued and the temperature of the reaction mixture rose to 134° C. in a few seconds and to a maximum of 174° C. under reflux in the following 4 minutes. On completion of the reaction, the crude product was worked up as in Example 4 to obtain an N-(3,3-dichloro-2-methylallyl)morpholine product as a liquid boiling at 70°–73° C. under 0.7 to 1.0 millimeter pressure and characterized by a refractive index ($n/D$) of 1.501 at 20° C. and a density (20°/4° C.) of 1.187.

Example 7

79.7 grams (0.5 mole) of 3,3,3-trichloro-2-methyl-1-propene was added portionwise to 170 grams (2 moles) of piperidine. Reaction ensued with the evolution of heat and the temperature of the mixture rose in a period of 15 minutes to 116° C. under reflux. A further 79.7 grams (0.5 mole) of 3,3,3-trichloro-2-methyl-1-propene was added rapidly with stirring at the above temperature. On completion of the reaction, the mixture was cooled and worked up as in Example 4 to obtain an N-(3,3-dichloro-2-methylallyl)piperidine product as a liquid boiling at 53°–56° C. under 0.09 to 0.1 millimeter pressure and characterized by a refractive index ($n/D$) of 1.500 at 20° C. and a density (20°/4° C.) of 1.103.

Example 8

159.5 grams (1 mole) of 1,1,3-trichloro-2-methyl-1-propene was added portionwise to 196 grams (2 moles) of cyclohexylamine. Reaction was initiated readily when the reactants were contacted, heat evolved and the temperature of the reaction mixture rose gradually to 80° C. and then rapidly to 137°–146° C. On completion of the reaction, the mixture was cooled and worked up as in Example 4 to obtain an N-(3,3-dichloro-2-methylallyl)-N-cyclohexylamine product as an oily liquid, boiling at 72.5°–83° C. under 0.4 to 0.6 millimeter pressure and having a refractive index ($n/D$) of 1.475 at 20° C. and a density (20°/4° C.) of 1.104.

Example 9

146 grams (2 moles) of normalbutylamine and 159.5 grams (1 mole) of a mixture of approximately equal proportions of 3,3,3-trichloro-2-methyl-1-propene and 1,1,3-trichloro-2-methyl-1-propene were mixed together and heated gently. Vigorous reaction ensued with the evolution of heat. On completion of the reaction, the product was worked up as in Example 4 to obtain an N-normalbutyl-N-(3,3-dichloro-2-methylallyl)amine product as a liquid, boiling at 63.5°–64° C. under 1 millimeter pressure and having a refractive index ($n/D$) of 1.475 at 20° C. and a density (20°/4° C.) of 1.053.

Example 10

363 grams (2 moles) of dicyclohexylamine and 159.5 grams (1 mole) of 1,1,3-trichloro-2-methyl-1-propene were mixed and heated at temperatures of 160° to 190° C. The product was worked up as in Example 4 to obtain an N-(3,3-dichloro-2-methylallyl)-N,N-dicyclohexylamine product as an oily liquid boiling at 72°–74° C. under 0.9 millimeter pressure and having a refractive index ($n/D$) of 1.485 at 20° C.

Example 11

79 grams (1 mole) of pyridine and 159.5 grams (1 mole) of 1,1,3-trichloro-2-methyl-1-propene were mixed and heated under reflux at gradually increasing temperatures up to a temperature of 120° C. When the temperature of the mixture reached 90° C. a red oily phase began to separate in the reaction mixture. When the temperature reached 120° C., external heating was discontinued and the heat of reaction carried the temperature of the mixture to 143° C. and the entire mixture was converted to the red oily phase. On completion of the reaction, the crude product was cooled to form a crystalline solid. The latter was washed with boiling carbon tetrachloride and dried under vacuum to obtain an N-(3,3-dichloro-2-methylallyl) pyridinium chloride product as a crystalline solid, melting at 136°–136.5° C. and soluble in alcohol and water.

In a similar fashion, 3,3,3-trichloro-2-methyl-1-propene or 1,1,3-trichloro-2-methyl-1-propene is reacted with diethylamine, isopropylamine, p-toluene, N-methyl-m-toluidine, p-chloroaniline and 2,5-xylidine to prepare N - (3,3 - dichloro - 2 - methylallyl) - N,N - diethylamine, N - (3,3 - dichloro - 2 - methylallyl)-N-isopropylamine, N - (3,3 - dichloro-2-methylallyl)-p-toluidine, N-(3,3 - dichloro - 2 - methylallyl) - N - methyl - m - toluidine, N-(3,3-dichloro-2-methylallyl)-p-chloroaniline and N-(3,3-dichloro-2-methylallyl)-2,5-xylidine, respectively. In like manner, 3,3,3-trichloro-2-methyl-1-propene is reacted with p-bromoaniline and 3,5-dichloroaniline to produce N-(3,3-dichloro-2-methylallyl)-p-bromoaniline and N - (3,3 - dichloro - 2 - methylallyl) - 3,5 - dichloroaniline, respectively.

Representative compounds of the invention were dispersed in water and applied at rates of 50 pounds of 3,3- dichloro-2-methylallylamine compound per acre to areas of soil planted with radish seed and infested with seed of Japanese millet and wild oats. Substantially complete control of the millet and wild oats was obtained without appreciable adverse effect on the germination and growth of the radish plants.

In further determinations, representative compounds of the invention were dispersed in water to form aqueous compositions containing 2 pounds of one of the 3,3-dichloro-2-methylallylamine compounds per 100 gallons of composition. The compositions gave kills of 80 to 100 percent when applied to house flies and American cockroaches.

We claim:

1. N - (1,1,3,3 - tetramethylbutyl) - N - (3,3 - dichloro-2-methylallyl)amine.

2. N,N - dinormalbutyl - N - (3,3 - dichloro - 2 - methylallyl)-amine.

3. N - (3,3 - dichloro - 2 - methylallyl) - N - cyclohexylamine.

4. N-(3,3-dichloro-2-methylallyl) piperidine.

References Cited in the file of this patent

UNITED STATES PATENTS 2,172,822    Tamele  ---------------  Sept. 12, 1939

FOREIGN PATENTS 494,416    Canada  ---------------  July 14, 1953